(12) United States Patent
Kim et al.

(10) Patent No.: US 8,178,000 B2
(45) Date of Patent: May 15, 2012

(54) DEEP RED PHOSPHOR AND METHOD OF MANUFACTURING THE SAME

(75) Inventors: Tae Gon Kim, Seoul (KR); Kubota Shunichi, Suwon-si (KR); Young Sic Kim, Seoul (KR); Seung Jae Im, Seoul (KR); Jae Ho Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1133 days.

(21) Appl. No.: 12/028,216

(22) Filed: Feb. 8, 2008

(65) Prior Publication Data

US 2008/0199728 A1    Aug. 21, 2008

(30) Foreign Application Priority Data

Feb. 16, 2007  (KR) .................. 10-2007-0016685

(51) Int. Cl.
*C09K 11/08*   (2006.01)
*C09K 11/66*   (2006.01)
*C09K 11/61*   (2006.01)

(52) U.S. Cl. ..................... 252/301.4 H; 252/301.4 F

(58) Field of Classification Search ........... 252/301.4 H, 252/301.4 F
See application file for complete search history.

(56) References Cited

U.S. PATENT DOCUMENTS

| | | | | |
|---|---|---|---|---|
| 2,748,303 | A * | 5/1956 | Thorington | 313/25 |
| 2,851,425 | A * | 9/1958 | Thorington | 252/301.6 F |
| 6,685,852 | B2 * | 2/2004 | Setlur et al. | 252/301.4 R |

* cited by examiner

*Primary Examiner* — C Melissa Koslow
*Assistant Examiner* — Matthew Hoban
(74) *Attorney, Agent, or Firm* — Cantor Colburn LLP

(57) ABSTRACT

Disclosed is a deep red phosphor (600 nm to 670 nm) of Mn activity having a chemical formula of $(k-x)MgOxAF_2GeO_2:yMn^{4+}$ where k is a real number between 2.8 and 5.0, x is a real number between 0.1 and 0.7, y is a real number between 0.005 and 0.015, and A is Ca, Sr, Ba, Zn, or a mixture thereof, or a mixture of Mg and at least one of Ca, Sr, Ba and Zn. The deep red phosphor has a high excitation efficiency and thus can be applied to light emitting diode (LED) packages, which uses an ultraviolet (UV) light source or a blue light source as an excitation light source. The deep red phosphor is applied to a phosphor layer of a phosphor lamp such as a cold cathode fluorescence lamp (CCFL) and a flat fluorescent lamp (FFL).

6 Claims, 16 Drawing Sheets

DEEP RED PHOSPHOR AND METHOD OF MANUFACTURING THE SAME

This application claims priority to Korean Patent Application No. 10-2007-0016685, filed on Feb. 16, 2007, and all the benefits accruing therefrom under 35 U.S.C §119, the contents of which in its entirety are hereby incorporated by reference.

BACKGROUND OF THE INVENTION

This disclosure relates to a deep red phosphor and a method of manufacturing the same.

A red phosphor is used as a visible-light emitting material for various displays or lamps such as light emitting diodes (LED) liquid crystal displays (LCD), and cold cathode fluorescence lamps (CCFL).

In general, white LEDs are formed of a combination of red, green and blue LEDs. However, these white LEDs embrace problems, such as high manufacturing cost and bulkiness, due to the complex driving circuits associated thereto.

In order to solve these problems, the white LEDs use an ultraviolet (IV) LED as its excitation light source. Further, the white LED is manufactured by combining a red phosphor, a green phosphor and a blue phosphor to thereby obtain nearly natural white light. Typically, this white LED uses UV light having a long wavelength of about 400 nm as its excitation light source. Accordingly, these phosphors used for fabricating the white LED need to have a high efficiency of visible light-emitting when excited by the UV excitation light source having such a long wavelength.

To obtain these white LEDs, many kinds of red phosphors, green phosphors and blue phosphors have been developed. However, brightness of the red phosphor is lower than that of the green phosphor or the blue phosphor. For this reason, the white LED is to contain a larger amount of red phosphor, relative to the blue phosphor or the green phosphor.

$3.5MgO.0.5MgF_2.GeO_2:Mn$ and $K_5Eu(WO_4)_{6.25}$ has been used as the red phosphor for long-wavelength UV LEDs. However, these materials exhibit relatively low brightness and emission efficiency when excited by an excitation light source of 400 nm or greater.

In particular, a high quality display device such as full HD TVs for displaying an abundant sense of color has been increasingly demanded. As such, the demand for the red phosphor, which is one of important factors to high-quality color display, has been increased. Further, the light-emitting efficiency of the red phosphor need be improved, especially in case of a deep red phosphor capable of displaying a deep red color.

SUMMARY OF THE INVENTION

Disclosed is a deep red phosphor of Mn activity having a chemical formula of $(k-x)MgOxAF_2GeO_2:yMn^{4+}$ where k is a real number between 2.8 and 5.0, x is a real number between 0.1 and 0.7, y is a real number between 0.005 and 0.015, and A is Ca, Sr, Ba, Zn, a mixture thereof, or a mixture of Mg and at least one of Ca, Sr, Ba and Zn.

The deep red phosphor is in a powder form, and includes non-light-emitting components such as an excessive amount of MgO and $AF_2$, in addition to an effective light-emitting material, i.e., $Mg_{28-z}A_zGe_{10-0.5z}O_{48-2z}F_{2z}$ (where A is a metal, and z is a real number in the range of $0 \leq z \leq 10x$).

Further disclosed is an LED package comprising a UV LED or a blue LED as a light source, and the above-described deep red phosphor configured to be excited by the light source.

Further disclosed is a phosphor lamp comprising a phosphor layer having the above-described deep red phosphor.

Further disclosed here is a method of manufacturing a deep red phosphor using a solid-state reaction. The method includes: forming a powder mixture by uniformly mixing MgO, $AF_2$ (where A is a metal), $GeO_2$, and Mn precursor compound with one another to have a mol ratio of (k-x):x:1:y where k is a real number between 2.8 and 5.0, x is a real number between 0.1 and 0.7, and y is a real number between 0.005 and 0.015; calcining the powder mixture by heat-treating the powder mixture at a temperature of 1000° C. to 1200° C. for 4 to 9 hours; and rinsing and filtering the calcined powder.

BRIEF DESCRIPTION OF THE DRAWINGS

The above and/or other aspects of the disclosed embodiments will become apparent and more readily appreciated from the following detailed description, taken in conjunction with the accompanying drawings, in which.

DETAILED DESCRIPTION OF THE INVENTION

Figure 1:
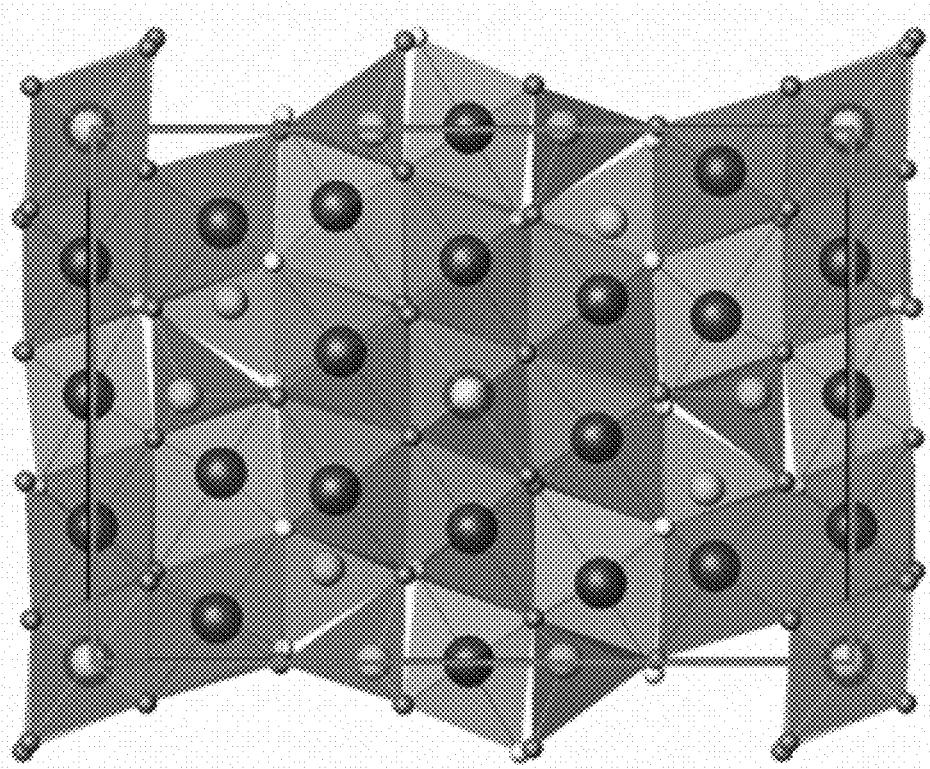
FIG. 1 shows a basic crystal structure of the light-emitting material within a phosphor according to an embodiment of the present invention.

Hereinafter, disclosed embodiments will now be described more fully with reference to the accompanying drawings, in which exemplary embodiments are shown.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and the thicknesses of layer and regions are exaggerated for clarity.

A deep red phosphor according to an embodiment is formed of a composition expressed by the following chemical formula 1, in which $Mn^{4+}$ serves as an activator.

$(k-x)MgO \cdot xAF_2GeO_2 \cdot yMn^{4+}$  [chemical formula 1]

In the chemical formula 1, k is a real number between 2.8 and 5.0, x is a real number between 0.1 and 0.7, and y is a real number between 0.005 and 0.015. The element "A" in the chemical formula 1 includes Ca, Sr, Ba, Zn, a mixture thereof, or a mixture of Mg and at least one of Ca, Sr, Ba and Zn.

The above phosphor may take a powder form, and this powder type phosphor may include an excessive amount of MgO or/and $AF_2$, in addition to an effective light-emitting material, i.e., $Mg_{28-z}A_zGe_{10-0.5z}O_{48-2x}F_{2z}$ (where A is a metal, and z is a real number in the range of $0 \leq z \leq 10x$).

FIG. 1 schematically illustrates a basic crystal structure of the light-emitting material within a phosphor according to an embodiment of the present invention.

Referring to FIG. 1, the basic crystal structure is configured in such a way that an Octahedral $MgO_6$ unit structure shares an edge with an octahedral $GeO_6$ unit structure, and also shares a corner with a tetrahedral $GeO_4$ unit structure. The rectangular portion in the crystal structure of FIG. 1 represents a unit cell. In the crystal structure of the deep phosphor according to the embodiment, although not shown, $Mn^{4+}$ is partially interposed in a $Ge^{4+}$ site or/and an $Mg^{2+}$ site. Elements such as Ca, Sr, Ba, and Zn, whose atomic sizes are different from that of Mg, substitute for the $Mg^{2+}$ site in an ionic state to locally deform or distort the host structure formed of Mg, thereby deteriorating the structural symmetry around $Mn^{4+}$ and thus enabling to improve the light-emitting efficiency therefor. F partially substitutes for the specific O sites as is expressed in FIG. 1.

The deep red phosphor of this embodiment has a high light-emitting efficiency improved up to 150% at maximum, as compared with the conventional $3.5MgO \cdot 0.5MgF_2 \cdot GeO_2$:$Mn^{4+}$ phosphor. Details thereon will be described later.

In particular, the deep red phosphor of this embodiment has an excellent excitation efficiency to UV light and blue light. Thus, the deep red phosphor can be applied to an LED package, which uses a UV LED light source or a blue LED light source as an excitation light source. Specifically, the deep red phosphor is mixed with a resin mold component within the package to thereby maximize deep red light-emitting efficiency of the LED package. Also, the deep red phosphor constitutes a phosphor composition in the phosphor layer of a phosphor lamp, such as a cold cathode fluorescent lamp (CCFL) and a flat fluorescent lamp (FFL), along with other phosphors, thereby enabling to improve the red based phosphor efficiency thereof.

The deep red phosphor of this embodiment can be manufactured by a solid-state reaction. To manufacture the deep red phosphor, first raw material powders are prepared.

MgO, $AF_2$ (where A is a metal), $GeO_2$, and Mn precursor compounds are used as the raw material powders. The raw material powders are mixed with one another to obtain a MgO:$AF_2$:$GeO_2$:Mn precursor compound having a mol ratio of (k-x):x:1:y. Here, k is a real number between 2.8 and 5.0, x is a real number between 0.1 and 0.7, and y is a real number between 0.005 and 0.015. For example, the raw material powders are uniformly mixed with one another for about one hour using a mortar.

$AF_2$ includes $CaF_2$, $SrF_2$, $BaF_2$ or $ZnF_2$ alone, or any combinations of two or more thereof, or any combinations thereof with $MgF_2$.

$MnCO_3$ and the like can be used as the Mn precursor compound.

The powder mixture prepared as above is heat-treated at a temperature of 1000° C. to 1200° C. for 4 to 9 hours, and then calcinated. In this case, Mn, which is an active component, is oxidized to $Mn^{4+}$ ($Mn^{2+} \rightarrow Mn^{4+}$).

The calcined powder is rinsed and filtered to obtain a deep red phosphor powder. The rinsing step is performed by distilled water or weak acid water.

The calcining step is carried out in an alumina vessel.

Hereinafter, the following examples are provided for illustrative purposes, but not intended to limit the present invention.

Example 1

6.937 g of MgO, 1.493 g of $CaF_2$, 5 g of $GeO_2$, and 0.055 g of $MnCO_3$, which are all powder forms, were mixed with one another for one hour using a mortar. The sufficiently-mixed phosphor raw material was contained in an alumina vessel and then calcined at 1150° C. for 5 hours. The phosphor was then rinsed and filtered to manufacture a final phosphor product of powder form. In this example, the manufactured phosphor has been found out to have a chemical formula of $3.6MgO \cdot 0.4CaF_2 \cdot GeO_2$:$0.01Mn^{4+}$.

Example 2

6.937 g of MgO, 2.401 g of $SrF_2$, 5 g of $GeO_2$, and 0.055 g of $MnCO_3$, which are all powder forms, were mixed with one another for one hour using a mortar. The sufficiently-mixed phosphor raw material was contained in an alumina vessel and then calcined at 1150° C. for 5 hours. The phosphor was then rinsed and filtered to manufacture a final phosphor product of powder form. In this example, the manufactured phosphor was found out to have a chemical formula of $3.6MgO.0.4SrF_2.GeO_2:0.01Mn^{4+}$.

Example 3

7.322 g of MgO, 1.677 g of $BaF_2$, of 5 g $GeO_2$, and 0.055 g of $MnCO_3$, which are all powder forms, were mixed with one another for one hour using a mortar. The sufficiently-mixed phosphor raw material was contained in an alumina vessel and then calcined at 1150° C. for 5 hours. The phosphor was then rinsed and filtered to manufacture a final phosphor product of powder form. In this example, the manufactured phosphor has been found out to have a chemical formula of $3.8MgO.0.2BaF_2.GeO_2:0.01Mn^{4+}$.

Example 4

6.744 g of MgO, 2.471 g of $ZnF_2$, 5 g of $GeO_2$, and 0.055 g of $MnCO_3$, which are all powder forms, were mixed with one another for one hour using a mortar. The sufficiently-mixed phosphor raw material was contained in an alumina vessel and then calcined at 1150° C. for 5 hours. The phosphor was then rinsed and filtered to manufacture a final phosphor product of powder form. In this example, the manufactured phosphor has been found out to have a chemical formula of $3.5MgO.0.5ZnF_2.GeO_2:0.01Mn^{4+}$.

Comparison Example 1

A conventional $3.5MgO.0.5MgF_2.GeO_2:0.01Mn^{4+}$ phosphor was used in the comparison example 1.

Comparison Example 2

5.973 g of MgO, 1.914 g of $CaCO_3$, 1.489 g of $MgF_2$, 5 g of $GeO_2$, and 0.055 g of $MuCO_3$, which are all powder forms, were mixed with one another for one hour using a mortar. The sufficiently-mixed phosphor raw material was contained in an alumina vessel and then calcined at 1150° C. for 5 hours. The phosphor was then rinsed and filtered to manufacture a final phosphor product of powder form. In this comparison example, the manufactured phosphor was found to have a chemical formula of $3.1MgO.0.4CaO.0.5MgF_2.GeO_2:0.01Mn^{4+}$. Specifically, in this comparison example, Ca has substituted for Mg in the MgO of the comparison example 1.

Comparison Example 3

5.973 g of MgO, 2.822 g of $SrCO_3$, 1.489 g of $MgF_2$, 5 g of $GeO_2$, and 0.055 g of $MnCO_3$, which are all powder forms, were mixed with one another for one hour using a mortar. The sufficiently-mixed phosphor raw material was contained in an alumina vessel and then calcined at 1150° C. for 5 hours. The phosphor was then rinsed and filtered to manufacture a final phosphor product of powder form. In this comparison example, the manufactured phosphor was found to have a chemical formula of $3.1MgO.0.4SrO.0.5MgF_2.GeO_2:0.01Mn^{4+}$. Specifically, in this comparison example, Sr has substituted for Mg in the MgO of the comparison example 1.

Comparison Example 4

5.781 g of MgO, 1.946 g of ZnO, 1.489 g of $MgF_2$, 5 g of $GeO_2$, and 0.055 g of $MnCO_3$, which are all powder forms, were mixed with one another for one hour using a mortar. The sufficiently-mixed phosphor raw material was contained in an alumina vessel and then calcined at 1150° C. for 5 hours. The phosphor was then rinsed and filtered to manufacture a final phosphor product of powder form. In this comparison example, the manufactured phosphor was found out to have a chemical formula of $3.0MgO.0.5ZnO.0.5MgF_2.GeO_2:0.01Mn^{4+}$. Specifically, in this comparison example, Zn has substituted for Mg in the MgO of the comparison example 1.

Evaluation of Light-Emitting Efficiency

The deep red phosphors manufactured in the above examples and comparison examples were tested for light-emitting efficiency.

[Test 1]

Light-emitting spectral distributions for the phosphors manufactured in the examples 1 to 4 and the comparison example 1 were obtained, using an excitation light source of 400 nm wavelength. That is, with the excitation wavelength fixed at 400 nm, relative integrated-intensities of the light-emitting spectrum of the phosphors were evaluated.

Figure 2:
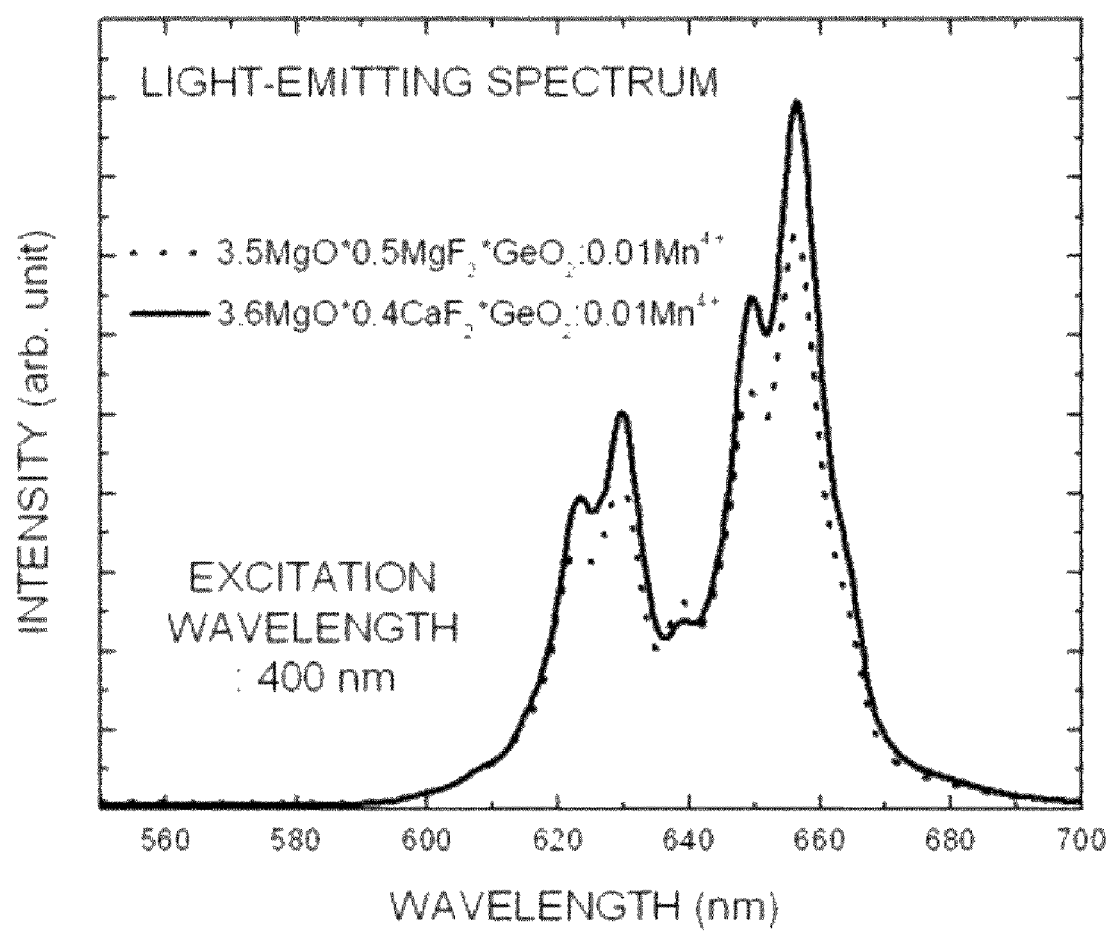
FIG. 2 shows light-emitting spectral distributions for the phosphors of the example 1 and the comparison example 1 when the excitation wavelength is 400 nm.
Figure 5:
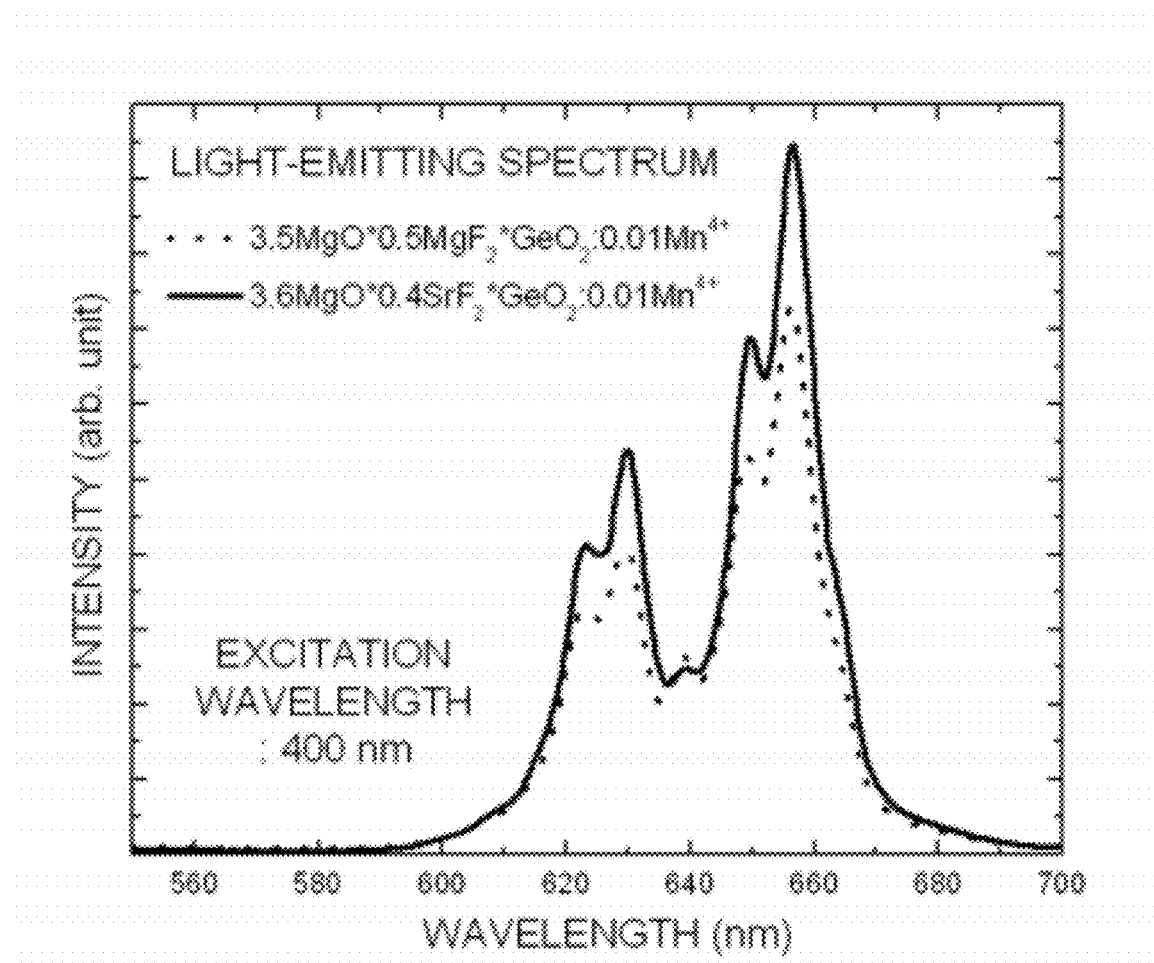
FIG. 5 shows light-emitting spectral distributions for the phosphor of the example 2 and the comparison example 1 when the excitation wavelength is 400 nm.
Figure 8:
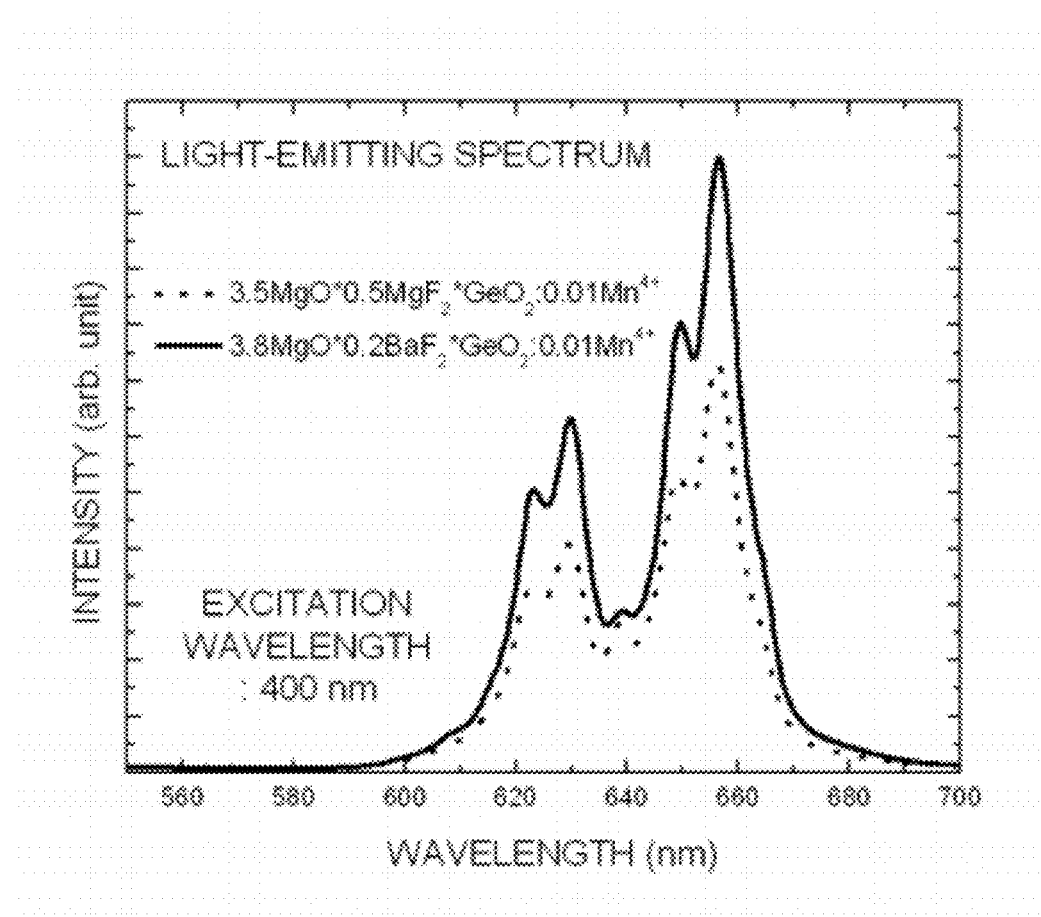
FIG. 8 shows light-emitting spectral distributions for the phosphor of the example 3 and the comparison example 1 when the excitation wavelength is 400 nm.
Figure 9:
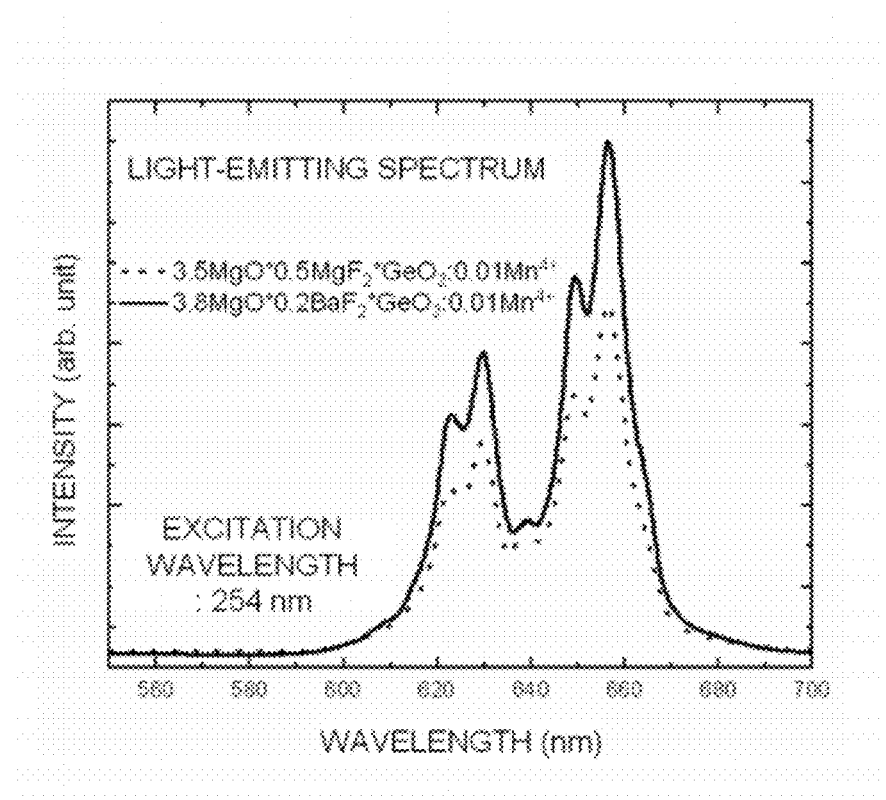
FIG. 9 shows light-emitting spectral distributions for the phosphor of the example 3 and the comparison example 1 when the excitation wavelength is 254 nm.
Figure 11:
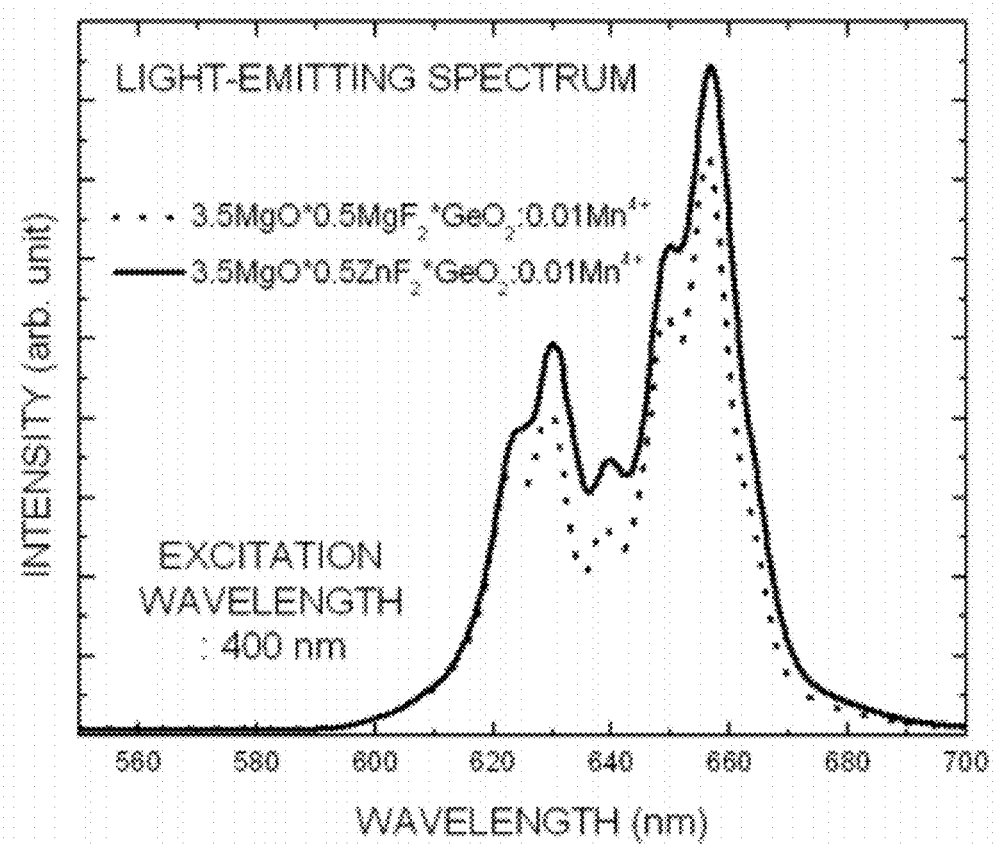
FIG. 11 shows light-emitting spectral distributions for the phosphor of the example 4 and the comparison example 1 when the excitation wavelength is 400 nm.
Figure 12:
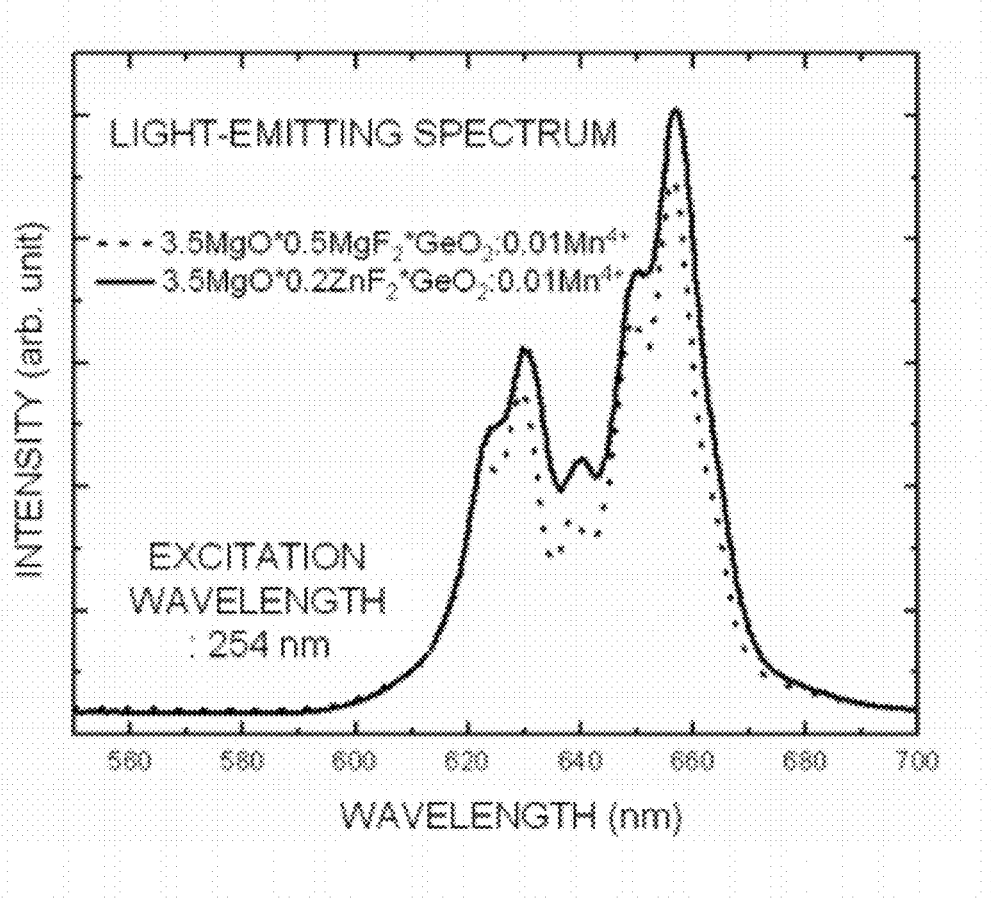
FIG. 12 shows light-emitting spectral distributions for the phosphor of the example 4 and the comparison example 1 when the excitation wavelength is 254 nm.

FIG. 2 shows the light-emitting spectral distributions for the phosphors obtained in the example 1 and the comparison example 1 when the excitation wavelength is 400 nm. FIG. 5 shows the light-emitting spectral distributions for the phosphors obtained in the example 2 and the comparison example 1 when the excitation wavelength is 400 nm. FIG. 8 shows the light-emitting spectral distributions for the phosphors obtained in the example 3 and the comparison example 1 when the excitation wavelength is 400 nm. FIG. 11 shows the light-emitting spectral distributions for the phosphor of each of the embodiment 4 and the comparable example 1 for a wavelength of 400 nm which is an excitation light source.

Referring to FIGS. 2, 5, 8, and 11, light-emitting efficiency for the phosphors of the examples 1 to 4 relative to the phosphor of the comparison example 1 (Relative Light-emitting Efficiency) was obtained from the results of the test 1 and summarized in Table 1 below.

TABLE 1

| Phosphor | Relative light-emitting efficiency |
|---|---|
| Example 1 | 116% |
| Example 2 | 122% |
| Example 3 | 143% |
| Example 4 | 123% |

[Test 2]

Light-emitting spectral distributions for the phosphors manufactured in the examples 1 to 4 and the comparison example 1 were obtained, using an excitation light source of 254 nm wavelength. Specifically, with the excitation wavelength fixed at 254 nm, relative integrated-intensities of the light-emitting spectrum of the phosphors were evaluated.

Figure 3:
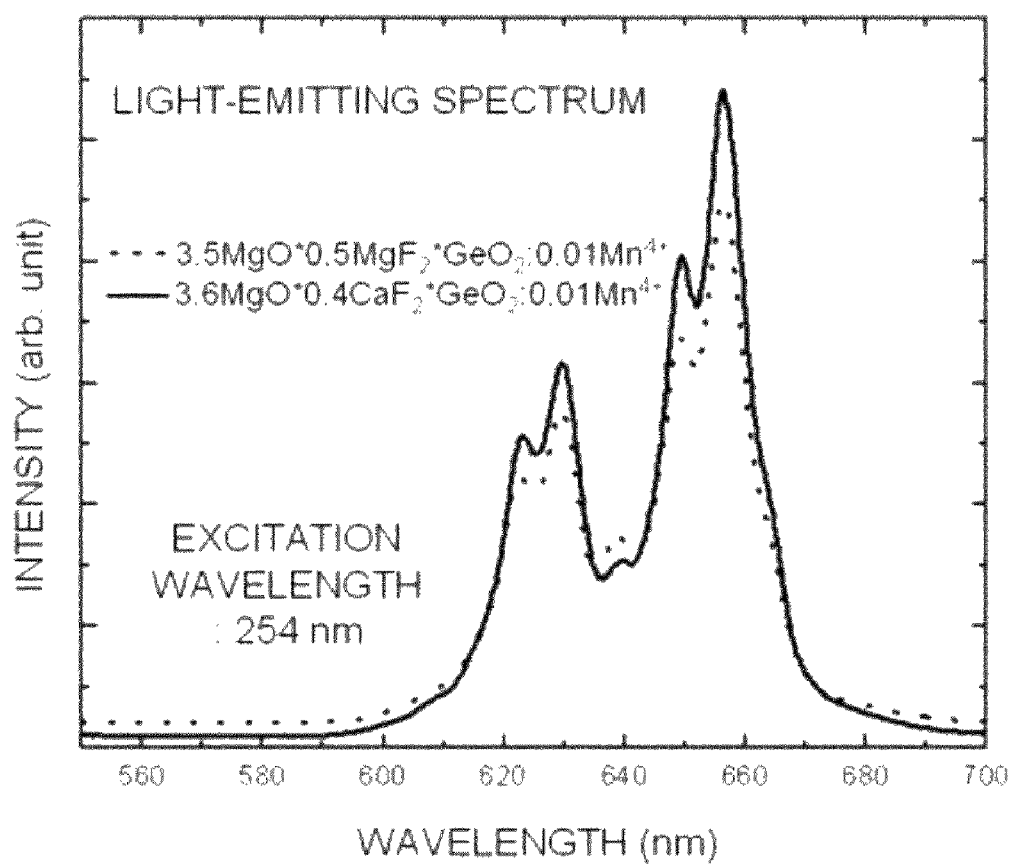
FIG. 3 shows light-emitting spectral distributions for the phosphor of the example 1 and the comparison example 1 when the excitation wavelength is 254 nm.
Figure 6:
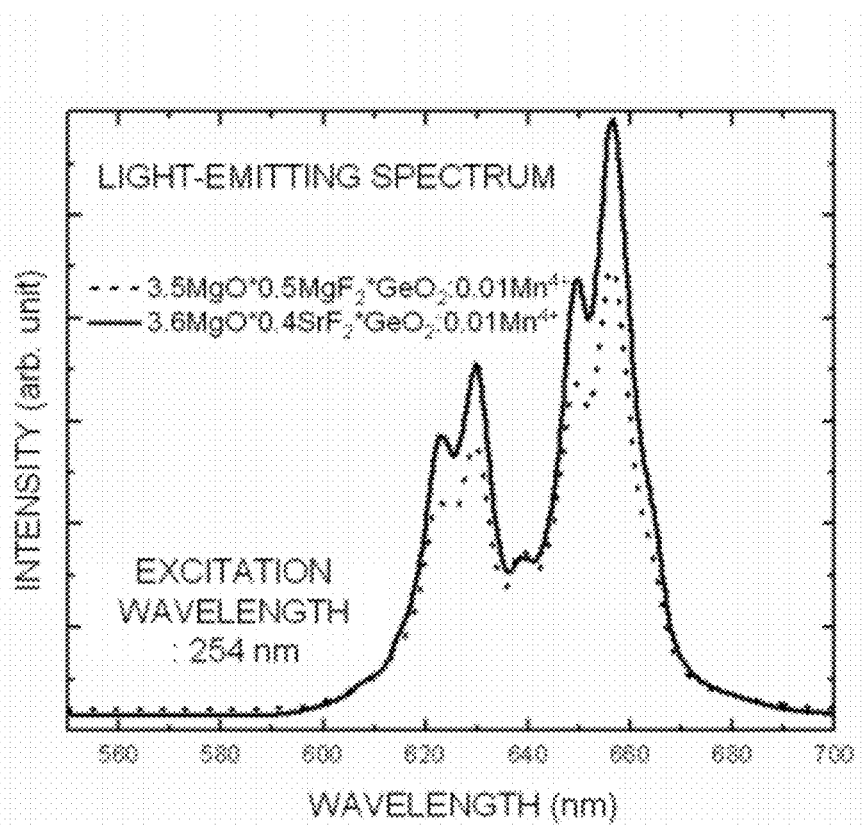
FIG. 6 shows light-emitting spectral distributions for the phosphor of the example 2 and the comparison example 1 when the excitation wavelength is 254 nm.

FIG. 3 shows the light-emitting spectral distributions for the phosphors obtained in the example 1 and the comparison example 1 when the excitation wavelength is 254 nm. FIG. 6 shows the light-emitting spectral distributions for the phosphors obtained in the example 2 and the comparison example 1 when the excitation wavelength is 254 nm. FIG. 8 shows the light-emitting spectral distributions for the phosphors obtained in the example 3 and the comparison example 1 when the excitation wavelength is 254 nm. FIG. 11 shows the light-emitting spectral distributions for the phosphors obtained in the example 4 and the comparison example 1 when the excitation wavelength is 254 nm.

Referring to FIGS. 3, 6, 9, and 12, light-emitting efficiency for the phosphors of the examples 1 to 4 relative to the phosphor of the comparison example 1 (Relative Light-emitting Efficiency) was obtained using the results of the test 2 and summarized in Table 2 below.

TABLE 2

| Phosphor | Relative light-emitting efficiency |
|---|---|
| Example 1 | 101% |
| Example 2 | 114% |
| Example 3 | 125% |
| Example 4 | 112% |

[Test 3]

Light-emitting spectral distributions for the phosphors manufactured in the examples 1 to 4 and the comparison example 1 were evaluated for a wavelength of 657 nm. Specifically, with the excitation wavelength fixed in the range of a peak wavelength of 657 nm, relative intensity of the peak wavelength spectrum was evaluated.

Figure 4:
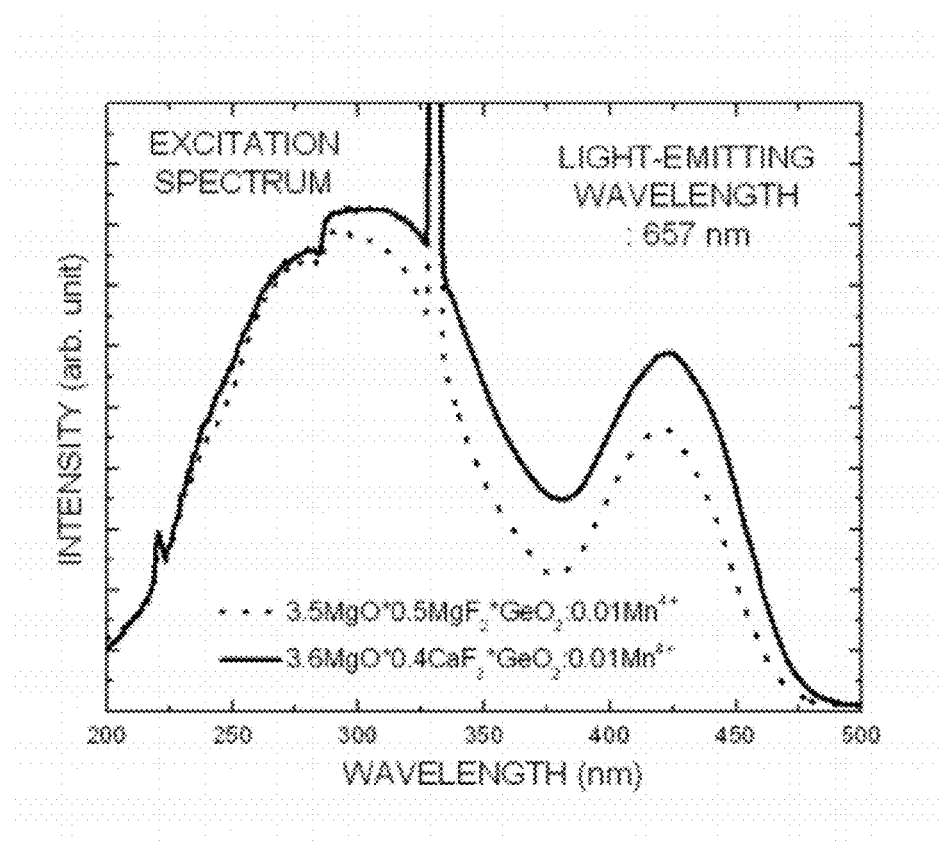
FIG. 4 shows light-emitting spectral distributions for the phosphor of the example 1 and the comparison example 1 when the excitation wavelength is 657 nm.
Figure 7:
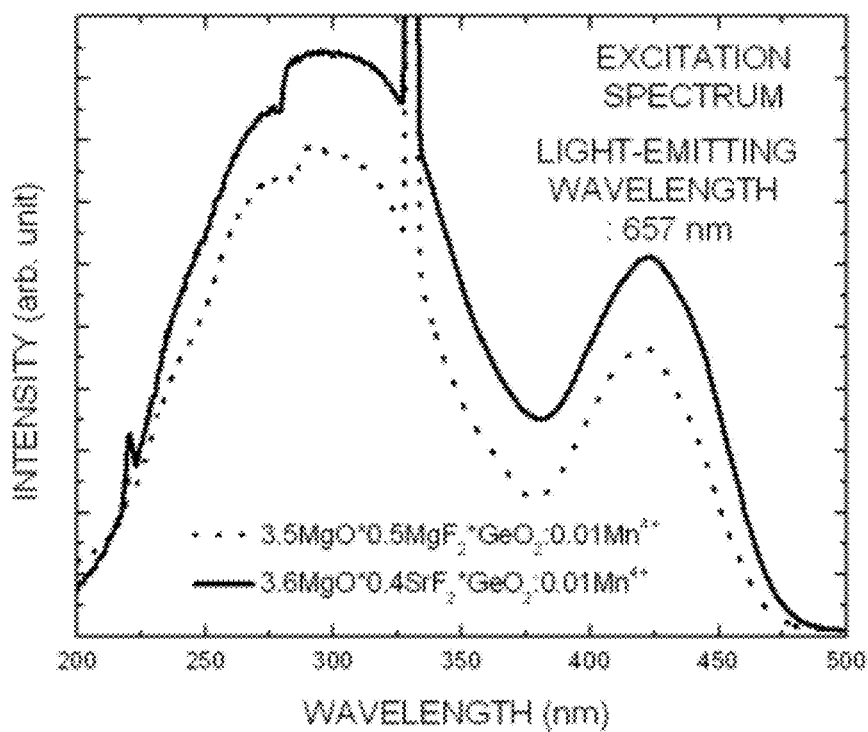
FIG. 7 shows light-emitting spectral distributions for the phosphor of the example 2 and the comparison example 1 when the excitation wavelength is 657 nm.
Figure 10:
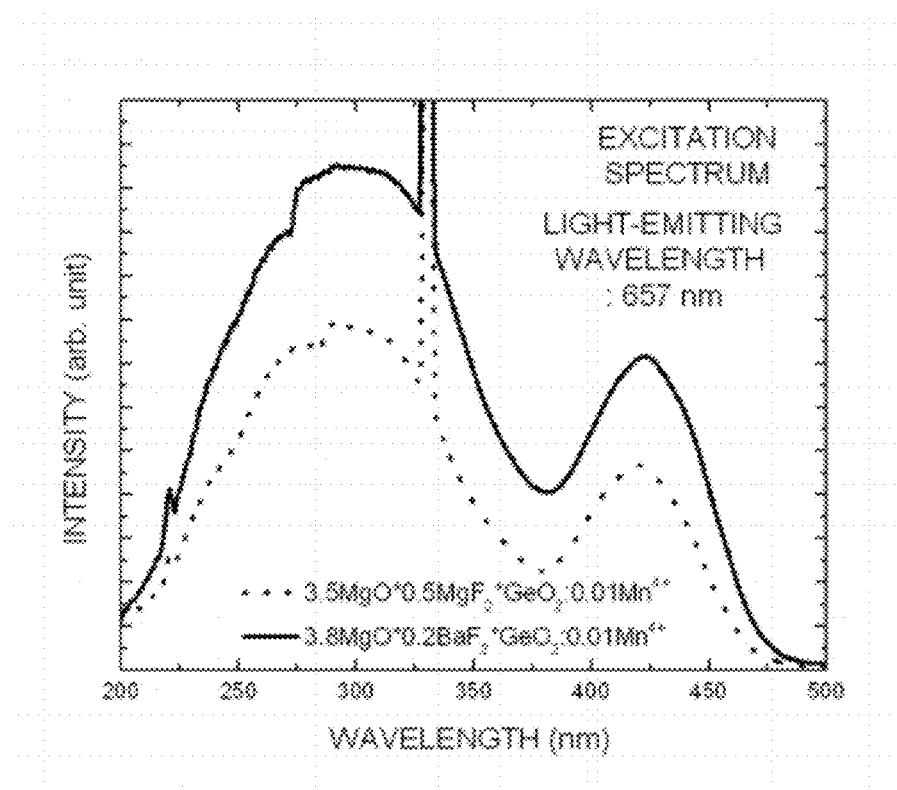
FIG. 10 shows light-emitting spectral distributions for the phosphor of the example 3 and the comparison example 1 when the excitation wavelength is 657 nm.
Figure 13:
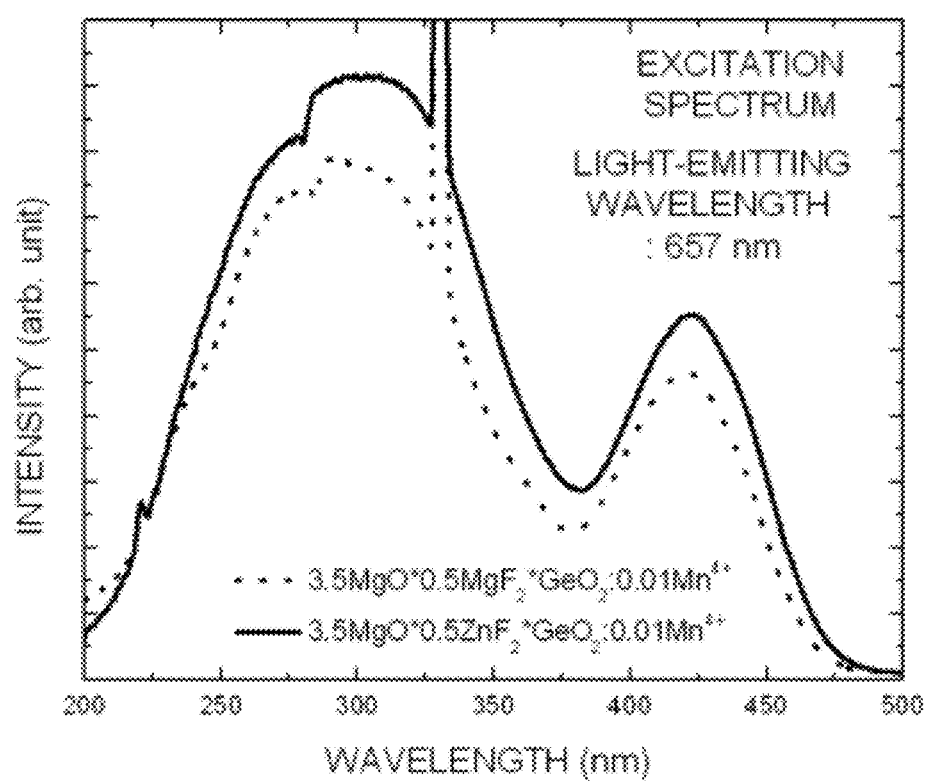
FIG. 13 shows light-emitting spectral distributions for the phosphor of the example 4 and the comparison example 1 when the excitation wavelength is 657 nm.

FIG. 4 shows the excitation spectral distributions for the phosphors of the example 1 and the comparison example 1 for a wavelength of 657 nm. FIG. 7 shows the excitation spectral distributions for the phosphors of the example 2 and the comparison example 1 for a wavelength of 657 nm. FIG. 10 shows the excitation spectral distributions for the phosphors of the example 3 and the comparison example 1 for a wavelength of 657 nm. FIG. 13 shows the excitation spectral distributions for the phosphors of the example 4 and the comparison example 1 for a wavelength of 657 nm.

Referring to FIGS. 4, 7, 10, and 13, it can be seen that the light-emitting efficiency of the phosphors of the examples 1 to 4 for the peak wavelength of 657 nm is more excellent than that of the phosphor of the comparison example 1.

[Test 4]

Light-emitting spectral distributions for the phosphors manufactured in the comparison examples 1 to 3 were evaluated using an excitation light source of 400 nm wavelength. Specifically, with the excitation wavelength fixed, relative integrated intensities of the light-emitting spectrums for the phosphors were evaluated.

Figure 14:
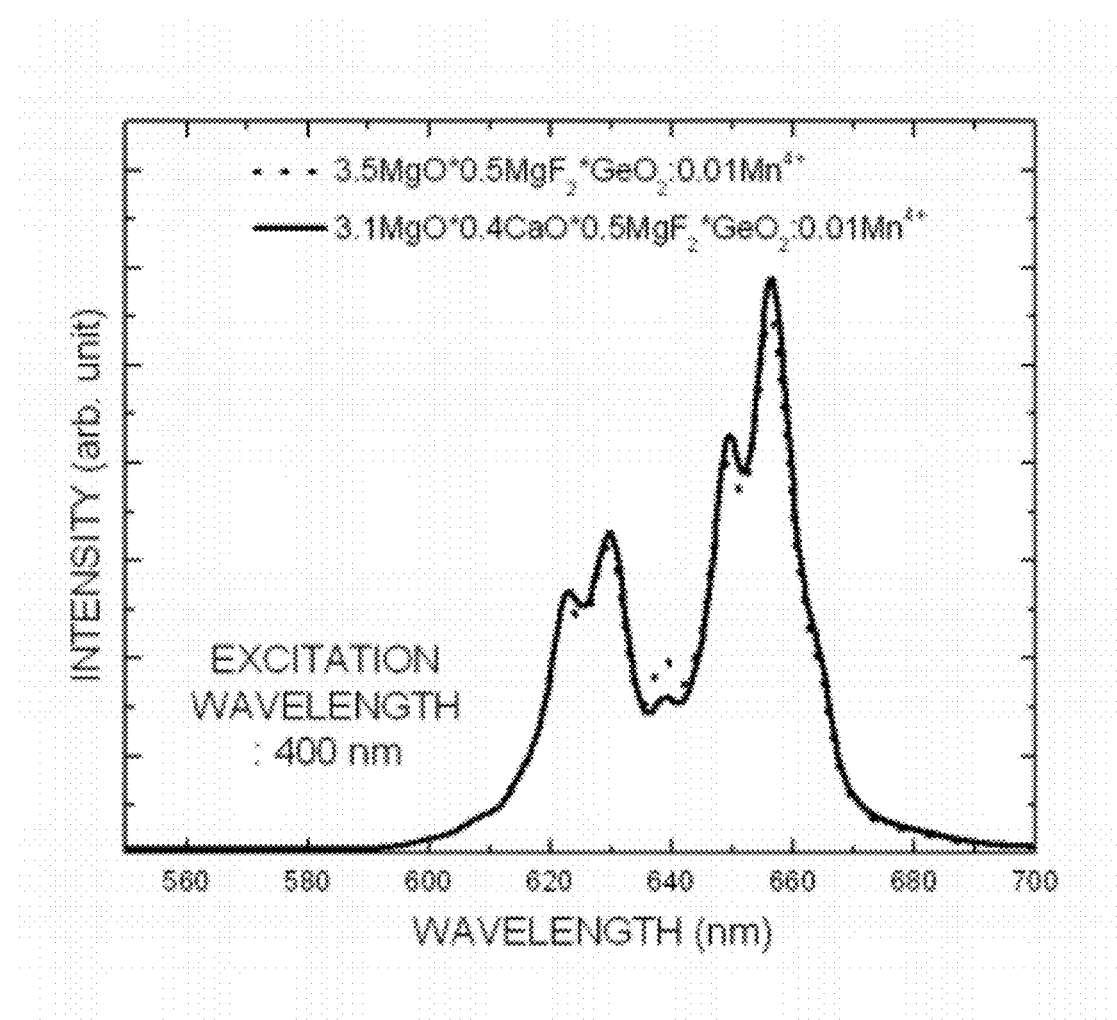
FIG. 14 shows light-emitting spectral distributions for the phosphor of the comparison example 2 and the comparison example 1 when the excitation wavelength is 400 nm.
Figure 15:
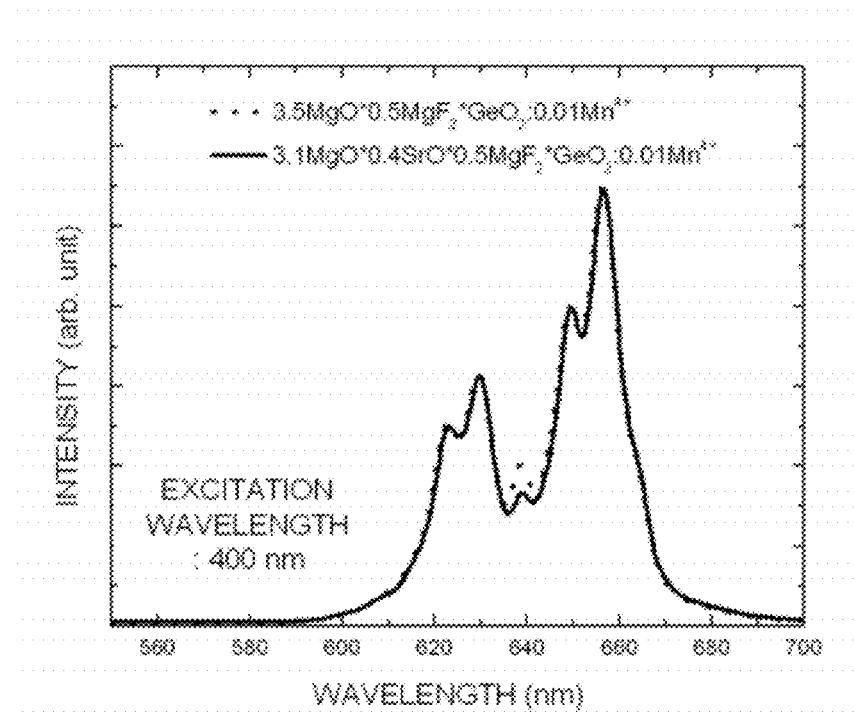
FIG. 15 shows light-emitting spectral distributions for the phosphor of the comparison example 3 and the comparison example 1 when the excitation wavelength is 254 nm.
Figure 16:
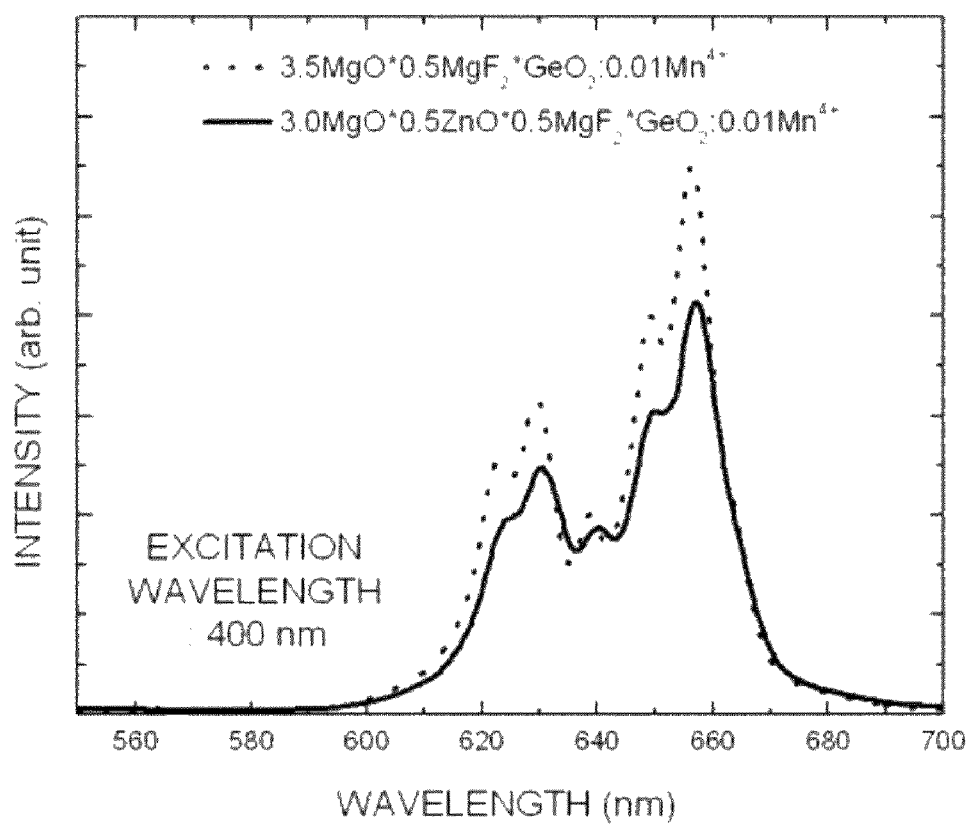
FIG. 16 shows light-emitting spectral distributions for the phosphor of the comparison example 4 and the comparison example 1 when the excitation wavelength is 657 nm.

FIG. 14 shows the light-emitting spectral distributions for the phosphors of the comparison examples 1 and 2 for the excitation wavelength of 400 nm. FIG. 15 shows the light-emitting spectral distributions for the phosphors of the comparison examples 1 and 3 for the excitation wavelength of 400 nm. FIG. 16 shows the light-emitting spectral distributions for the phosphors of the comparison examples 1 and 4 for the excitation wavelength of 400 nm.

Referring to FIGS. 14 through 16, light-emitting efficiencies for the phosphors of the comparison examples 2 to 4 relative to the comparison example 1 (Relative Light-emitting Efficiency) were obtained from the results of the test 4 and summarized in Table 3 below.

TABLE 3

| Phosphor | Relative light-emitting efficiency |
|---|---|
| Comparison example 2 | 98% |
| Comparison example 3 | 103% |
| Comparison example 4 | 85% |

It can be seen from the table 3 that there is no improvement in the light-emitting efficiency, in case where other elements such as Ca has substituted for Mg in the MgO of the phosphor $3.5MgO \cdot 0.5MgF_2 \cdot GeO_2:0.01Mn^{4+}$ obtained from the comparison example 1.

Since the deep red phosphor is used to improve color rendering of the white LED and the phosphor lamp, which includes a UV light source or a blue light source, a light-emitting device having high brightness and high color rendering can be manufactured. Further, it is expected that the deep red phosphor can replace a red LED, which is used for a signal lamp, a rear lamp of a car, and a security lamp.

Also, the deep red phosphor according to the present invention can be used as a light source of various display devices such as a phosphor lamp so that the display device can obtain improved display image.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguished one element from another. Furthermore, the use of the terms a, an, etc. do not denote a limitation of quantity, but rather denote the presence of at least one of the referenced item.

What is claimed is:

1. A deep red phosphor of Mn activity and having the following chemical formula 1:

$(k-x)MgO \cdot xAF_2 \cdot GeO_2:yMn^{4+}$     [chemical formula 1]

where k is a real number between 2.8 and 5.0, x is a real number between 0.1 and 0.7, y is a real number between 0.005 and 0.015, and A is Ca, Sr, Ba, a mixture thereof, or a mixture of Mg and at least one of Ca, Sr, and Ba.

2. The deep red phosphor of Mn activity of claim 1, wherein A is Ba, and a UV light source, a blue light source or a mercury light source are used as an excitation light source, the deep red phosphor has at least 120% of light-emitting efficiency, relative to a phosphor of $3.5MgO \cdot 0.5MgF_2 \cdot GeO_2:Mn^{4+}$.

3. A light emitting diode (LED) package comprising: an ultraviolet (UV) light emitting diode (LED) or a blue LED as a light source; and a deep red phosphor according to claim 1 being arranged so as to be excited by the light source.

4. A phosphor lamp comprising: a phosphor layer having a deep red phosphor according to claim 1.

5. The phosphor lamp of claim 4, wherein the phosphor lamp includes a cold cathode fluorescent lamp (CCFL) or a flat fluorescent lamp (FFL).

6. The phosphor lamp of claim 5, further comprising a mercury light source as an excitation light source.